April 12, 1966 A. R. BRAULT 3,245,747
MEANS FOR ANIMATING CATHODE RAY TUBE DISPLAYS
Filed Nov. 5, 1962 2 Sheets-Sheet 1
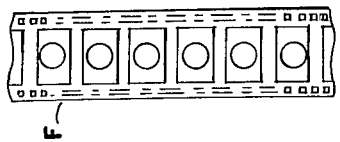
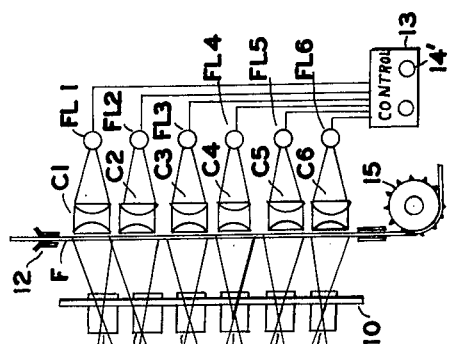
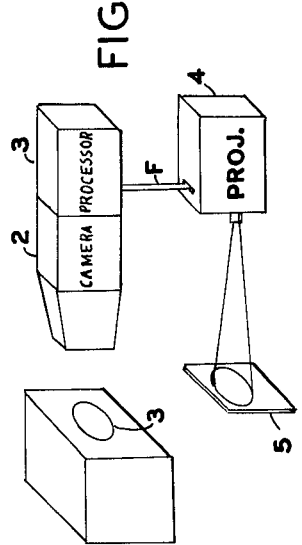
INVENTOR.
ANDRE R. BRAULT
BY James P. Malone April 12, 1966  A. R. BRAULT  3,245,747
MEANS FOR ANIMATING CATHODE RAY TUBE DISPLAYS
Filed Nov. 5, 1962  2 Sheets-Sheet 2
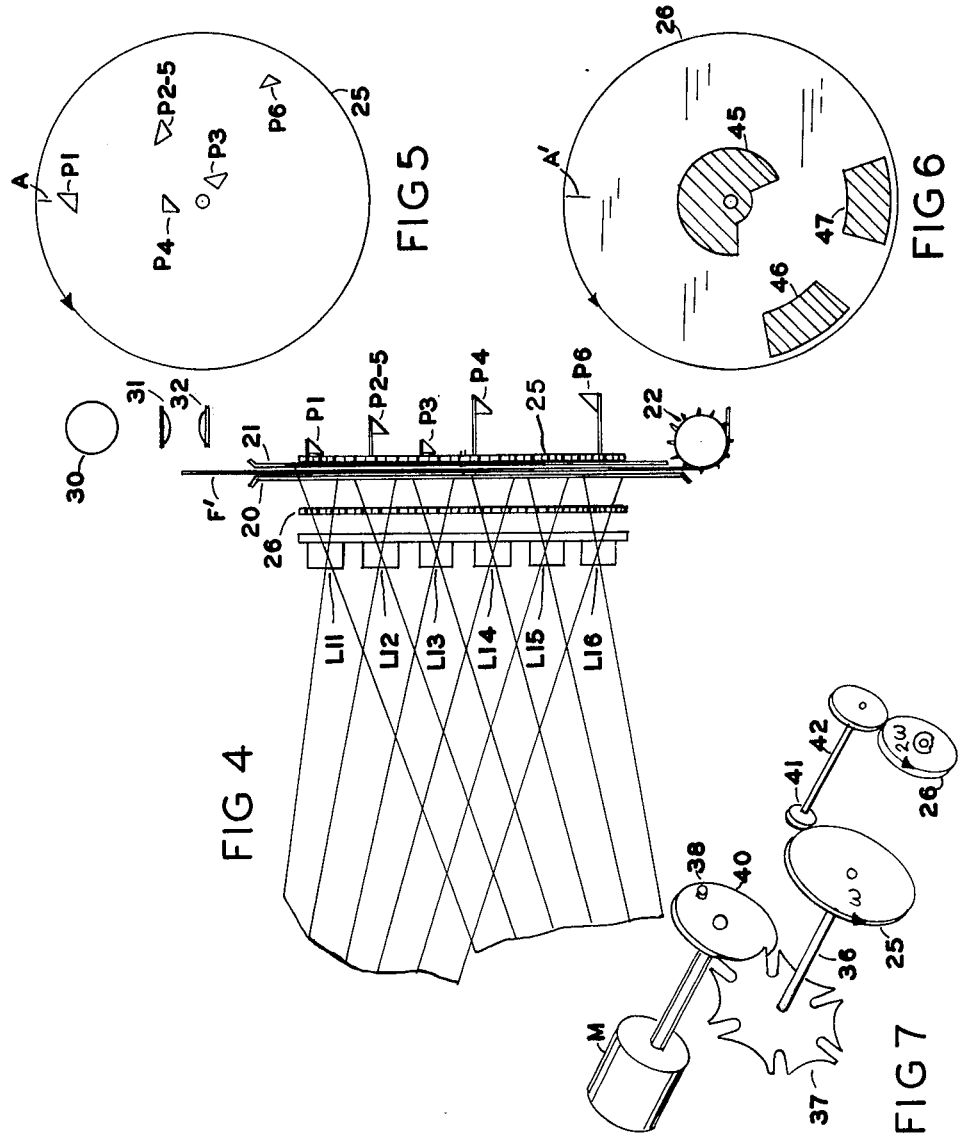
INVENTOR.
ANDRE R. BRAULT
BY James P. Malone

United States Patent Office 3,245,747
Patented Apr. 12, 1966

3,245,747
MEANS FOR ANIMATING CATHODE RAY
TUBE DISPLAYS
Andre R. Brault, North Merrick, N.Y., assignor to
OPTOmechanisms, Incorporated, Plainview, N.Y.
Filed Nov. 5, 1962, Ser. No. 235,465
1 Claim. (Cl. 352—84)

This invention relates to means and methods for animating cathode ray tube displays or presentations and more particularly to radar type presentations, with a time compression technique.

More particularly the invention comprises means for taking pictures of the cathode ray tube presentations at predetermined time intervals, high speed means for processing the film in a few seconds and means for projecting the pictures on a viewing screen.

It is a recognized fact that data reduction of radar, and sonar scope presentations frequently requires a trained observer to view an extended series of consecutive images to determine the existence of a target, and then to apply judgement to confirm this determination. The operator must retain mental pictures and markings of preceding displays and correlate them to the current pattern. Unless he has a definite idea that a target does exist, he spends considerable time discriminating against the confusion of harsh and random noises. This is further complicated when very slow moving marine targets appear on sonar screens and at times when long range radar searches are in progress.

In seeking a means to make targets more readily discernable I have conceived and analyzed a number of approaches to the problem. It was not until the advent of rapid film processing that a straight forward approach to time compression became available. It is now practical to expose film, process and fix it, all in about four seconds or less. By combining the rapid processor with an electrically operated scope camera and a rear projector, the entire sequence is accomplished in a relatively small package.

If we now accumulate a series of for instance, six frames, representing pictures of each radar or sonar sweep and project them at motion picture frame rate, the new presentation animates the target and it becomes easily detectable. Each time a new frame is added, the oldest frame is delated from the sequence. Furthermore, the cine form of animation can include a variable frame rate to clearly emphasize the relative movement of the target position.

Theory of operation

The time compression system mounts against the working scope or against the face of a slave cathode ray tube. In the former instance, a periscope attachment forms a simple hood and the screen can be viewed directly by the operator. At each scan cycle a photograph is automatically taken on continuous 35 mm. film and transported to the processor. The processed diameter is .625 inch with a target area occurring every .750 inch of film travel. The processed film is then viewed on a rear projection screen in a ratio of 11:1 or better. The animator will be located on the projection side of the processor-viewer. In the proposed methods the film is not touched or moved during projection therefore, the image-taking qualities of the camera section are not jeopardized and registration is maintained. Depending on the number of frames it is desired to animate, a choice is made for the size of the projection means. For the purposes of discussion I have selected six frames to be reviewed after processing. Each time a new frame is processed and moved into the projection film track, the oldest frame is dropped and wound on the take-up spool.

Accordingly a principal object of the invention is to provide new and improved means for presenting cathode ray tube presentations.

Another object of the invention is to provide new and improved means for radar and sonar presentations.

Another object of the invention is to provide new and improved means for animating cathode ray tube presentations wherein the time compression projector incorporates a series of lenses adapted to project frames of said film in a predetermined sequence.

These and other objects of the invention will be apparent from the following specifications and drawings of which;

FIGURE 1 is schematic diagram of an embodiment of the invention.

FIGURE 2 is a schematic view of a time compression projector using a series of flash bulbs.

FIGURE 3 is a vertical view of the film of the cathode ray presentations.

FIGURE 4 is a schematic diagram of a time compression projector using a plurality of prisms mounted on a rotatable mounting.

FIGURE 5 is a detail view of the prism support disc of the embodiment of FIGURE 4.

FIGURE 6 is a detail view of the shutter of the embodiment of FIGURE 4.

FIGURE 7 is a schematic view of the gearing for the embodiment of FIGURE 4.

Referring to the figures, FIGURE 1 shows a presentation device which incorporates a cathode ray tube 3, for instance a radar or sonar device indicator of the PPI type which plots targets according to their range or bearing.

Camera 2 takes pictures of the radar screen 3. The camera film is then developed in a conventional high speed processor 3. The processing takes approximately four seconds. The film F is then fed to the time compression projector 4 for projecting the various frames on to the screen 5 in a predetermined time sequence as will be explained.

The optics of one embodiment of the invention are illustrated in FIGURE 2. All lenses L1–L6 are mounted in line in a plate 10 and adjusted to fixed focus on the rear projection screen 11. The film F, also shown in FIGURE 3 is supported in the gate 12 having fixed round apertures proportional to the size of the cathode ray tube image on film. Individual condensing optics C1–C6 are used for each flash lamp illuminating each film frame.

In FIGURE 2, in a first Mode of operation, flash lamps FL1, FL3, etc. will be discharged consecutively at peaks of 1/24 second at a rate of 24 frames per second for consecutive frames by flash control 13. The repetition rate of the pulses is adjustable, and can be varied manually by the operator with knob 14. Flash lamps for this type of service are known to have a life expectancy in excess of one billion cycles.

There are no moving parts involved in the film projection operations; all functions are electronically controlled.

The number of frames designated by C1–C2–C3–C4- lenses can be varied by increasing or decreasing the number of lenses. This is dependent on the optical conjugates of the lenses chosen and distance from the lens to the projector screen. The same system may be used to superimpose alternate guide forms on alternate background sequences.

It should be noted that all lenses are mounted parallel to each other and perpendicular to both object and image. By using these lenses decentered off optical axis it is practical to obtain pictures which are not distorted to the viewer. The result is a reliable, compact system with high resolution and perfect registration.

A system of this type has great versatility because of the static nature of the projection system. With simple electronic circuits the projected frame rate can be increased or decreased. Furthermore, a very smooth animation can be produced because dark shutter time of conventional projectors is not used. The addition of a new frame to the projected series may be a manual or automatic operation of sprocket 15.

FIGURE 4 shows the optics of another embodiment of the time compression projection system. The cine presentation is made on a viewing screen diameter of approximately 8 inches or larger if required. The proposed system can be used within an object to image distance of approximately 12 to 20 inches by using one inch focal length lenses as shown. The lenses L11 to L16 are mounted in a straight line in front of the film strip. The prisms P1–P6 are arranged so that as a geneva mechanism, FIGURE 7, rotates the prism support disc 25 the frames are projected in proper sequence. I have shown a sequence of six frames, however a greater number of frames can also be scanned.

More specifically FIGURES 4, 5, 6, and 7 show an embodiment of the invention wherein the film F' is fed through the locating plates 20, 21 by means of the sprocket 22. A plurality prisms P1 through P6 are mounted on a disc 25, FIGURE 5, which is rotatably mounted behind the film F'. Between the prism disc 25 and the film F' is mounted a rotatable capping shutter 26, FIGURE 6. The projection system comprises a lamp 30, condenser lens 31, 32, and prisms P1 to P6.

In FIGURE 5, prism P1 is shown at the top. P2 is shown 60° clockwise from it and P3 another 60° clockwise. Thus, frames 1, 2, and 3, will be projected in sequence as the disc 25 revolves. It is seen that P4 is directly below P1 and 240° clockwise from P3. Since the disc rotates about a centerline midway between the six positions, there is a phase relationship of 180° plus 60° equal the 240° relationship between P3 and P4.

Similarly, P5 lags P4 by 60° and P6 lags P5 by another 60°. Thus, P2 and P5 are one and the same prism and only five prisms are required for projecting the six frames. The prisms are grouped in different planes offset from disc 25 to eliminate interference, as shown in FIGURE 4. FIGURE 4 shows the prisms each at their operating angle.

The rotating capping shutter FIGURE 6 consists of a transparent disc 26 which has opaque areas 45, 46, 47, where capping is required. To provide a relationship between the lens support disc and the capping shutter, such that capping and uncapping is obtained at proper intervals, the capping shutter 26 rotates in 120° steps at twice the speed of the prism support disc 25 which means in 60° steps. The gearing schematic FIGURE 7 illustrates the means of obtaining the necessary motions by utilizing a motor driven one-pin six-slot geneva motion. Zero reference marks A and A' are provided on discs 25 and 26.

It is expected that viewing will occur at about 24 frames per second which is equal to four revolutions per second or 240 r.p.m. of the lens support disc 25. Appropriate reduction from the commercial drive motor is provided.

It should be noted that all lenses are mounted parallel to each other and perpendicular to both object and image. By using these lenses off center it is practical to obtain pictures which are undistorted to the viewer. The result is a reliable, compact system with high resolution and perfect registration.

FIGURE 7 shows a typical gearing arrangement for the prism disc 25 and the shutter disc 26. The prism disc is mounted on a shaft 36 on the other end which is mounted a starwheel 37 having a series of slots in its rim adapted to receive the pin 38 on the disc 40. The star wheel 37 and the disk and pin comprise a geneva movement which rotates the shaft 36 in 60° steps as the disc 40 is rotated by the motor M. The shutter disc 26 is arranged to move in 120° steps by means of the gear 41 mounted on shaft 42 on the other end which is mounted a gear 43 which is geared to the disc 26.

Some of the advantages of the present time compression system are:

(a) Animates a sequence of events which culminate in the current status of the situation.
(b) Enables detection of targets quickly and positively.
(c) Distinguishes targets from random noise and fixed objects.
(d) Enhances the detection of slow moving targets.
(e) Materially alleviates the problem of mental retention of prior data and offsets suspicion of non-targets.

The system will record, rapidly process and project sequences of images as they appear on the face of a cathode ray tube, thus providing apparent animation to slowly moving targets and assuring rapid identification.

The camera lens photographs the images on commercially available film. The processing chamber develops and fixes the film for immediate projection. The projection system projects the single frame immediately it emerges from the processing chamber and scans the most recent frame with the five adjacent frames. The single or cine presentation is projected on a rear projection screen. As each new recording is processed, it will move into the scanning field, displacing the oldest frame.

The camera lens shall preferably be $f2.5$ or faster; the focal length to be compatible with the 7" image of the CR tube and the .625" image at the 35 mm. film plane. The camera lens and film combination is preferably capable of resolving at least 30 lines per millimeter.

As each individual frame of film is processed it shall enter a projection station. The frames are viewed on a rear projection screen to approximately the same magnification as the images appearing on the face of the cathode ray tube. The projection lenses are preferably mounted in focussing mounts but shall be fixed in focus on the surface of the rear projection screen.

The technique of the present invention may be used with a conventional shutter camera to take pictures of any color moving events such as photographic clouds or smoke trails for seeing the formation of storms. These pictures may be taken at rather long intervals and the viewing intervals may be compressed to animate and show clearly the movement of a cloud or other object.

I claim:

Means to project strip film pictures in predetermined sequence comprising,
 means to hold said film in a first plane,
 a light source,
 a rotatable disc mounted in a plane parallel to said film plane,
 a plurality of prisms mounted on said disc, said prisms being spaced to pass light from said source through separate frames in said film as said disc is rotated in equal increments, whereby as said disc is rotated successive pictures on said film are projected.

References Cited by the Examiner

UNITED STATES PATENTS

| | | | |
|---|---|---|---|
| 1,070,699 | 8/1913 | Kitsee | 352—41 |
| 1,698,223 | 1/1929 | Craig | 352—200 X |
| 2,373,114 | 4/1945 | Goldsmith. | |
| 2,586,772 | 2/1952 | Ashby et al. | |
| 3,001,187 | 9/1961 | Hammond et al. | |
| 3,044,045 | 7/1962 | Kemp | 343—17.1 X |
| 3,057,252 | 10/1962 | Coburn | 352—84 |

FOREIGN PATENTS

| | | |
|---|---|---|
| 643,263 | 9/1950 | Great Britain. |
| 643,648 | 9/1950 | Great Britain. |

NORTON ANSHER, *Primary Examiner.*

WILLIAM MISIEK, *Examiner.*